Patented Apr. 9, 1935

1,997,305

UNITED STATES PATENT OFFICE 1,997,305

DERIVATIVES OF ACENAPHTHENE AND PROCESS OF MAKING SAME

Otto B. May, South Orange, N. J.

No Drawing. Application June 3, 1932,
Serial No. 615,267

3 Claims. (Cl. 260—131)

My present invention relates generally to new and useful compounds for the manufacture of dyestuffs and process of making same; and more particularly to a new ring compound obtained from acenaphthene and phthalic anhydride. It is known that acenaphthene when condensed with phthalic anhydride under certain condition forms acenaphthene-3-benzoyl-o-carboxylic acid. I have discovered that when acenaphthene is fused with phthalic anhydride and anhydrous aluminum chloride at higher temperatures than required for the formation of acenaphthene-3-benzoyl-o-carboxylic acid, one of the phthalic carboxyl groups is eliminated and a ring compound is formed, represented by the following probable graphic formula:

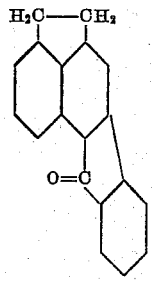

However, I do not wish to be understood as binding myself to this precise formula. This same ring compound can also be obtained by subjecting a mixture of acenaphthene-4-benzoyl-o-carboxylic acid and anhydrous aluminum chloride to elevated temperatures.

In the ring compound so obtained the two methylene groups of the acenaphthene molecule are still intact. It is therefore susceptible to the reactions affecting these methylene groups in the same way as acenaphthene itself is susceptible, (Journal of Industrial and Engineering Chemistry, vol. 13, pp. 822–830). For example, the methylene groups can be oxidized by the known methods leading to the oxidation products of the acenaphthene methylene groups and the corresponding oxidation products of the new ring compound can thus be obtained. The anhydride of the corresponding dicarboxylic acid is the final member of these oxidation reactions and has the following probable formula:

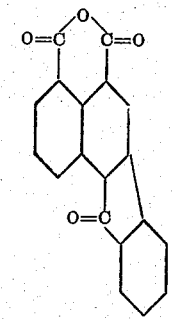

The following examples will illustrate the methods of producing my new ring compound, the parts being in weight, without restricting myself to the exact conditions as given.

*Example 1.*—100 parts of acenaphthene and 96 parts of phthalic anhydride are intimately mixed with 800 parts of anhydrous aluminum chloride and heated to 150° to 200° C. for several hours. After cooling the melt is pulverized, heated with dilute hydrochloric acid and filtered. The residue is washed free from acid and dried. The dry material is extracted with a suitable organic solvent, such as alcohol, from which the new ring compound crystallizes in yellow needles. It is soluble in concentrated sulfuric acid with yellowish brown color and greenish fluorescence. It is insoluble in water and alkali. It is not reduced by sodium hydrosulfite or other reducing agents. It is oxidized to the inner anhydride of the corresponding acenaphthene dicarboxylic acid when treated with suitable oxidizing agents. This oxidation may be carried out in the following manner: 10 parts of the compound resulting from the fusion of acenaphthene, phthalic anhydride and aluminum chloride are dissolved in 100 parts of glacial acetic acid, heated to boiling, and 3 to 4 parts of sodium dichromate added in small portions. After addition of the sodium dichromate the mixture is kept at boiling temperature for 2 to 3 hours, then poured into a relatively large quantity of water, filtered and washed free from chromium salts. This oxidation compound is soluble, upon warming, in dilute alkali, forming the corresponding alkali salts of the dicarboxylic acid, which latter may be precipitated from these alkali solutions by addition of mineral acids.

*Example 2.*—100 parts of acenaphthene-3-benzoyl-o-carboxylic acid are intimately mixed with 400 parts of anhydrous aluminum chloride and heated to 150° to 200° C. for several hours. After cooling the melt is treated in the manner described in Example 1, the resulting product being identical with that obtained by starting with acenaphthene and phthalic anhydride.

Having thus described my invention and the preferred method of practicing same, but without intending thereby to limit the scope of my invention to such method or the examples given, save as required by the claims, I claim as new and novel:

1. The process of producing a ring compound by fusing acenaphthene and phthalic anhydride with anhydrous aluminum chloride.

2. The process of producing a ring compound by fusing acenaphthene-3-benzoyl-o-carboxylic acid with anhydrous aluminum chloride.

3. A ring compound having the probable formula

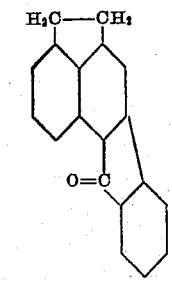

the said compound being the product resultant from the fusion of acenaphthene with phthalic anhydride in the presence of anhydrous aluminum chloride at a temperature between 150° and 200° C., said product containing no acid radical; crystallizing from alcoholic solutions in yellow needles; being soluble in sulfuric acid with yellowish brown color and greenish fluorescence and insoluble in aqueous alkali solution.

OTTO B. MAY.